United States Patent [19]

Lesage et al.

[11] Patent Number: 5,296,014
[45] Date of Patent: Mar. 22, 1994

[54] DEVICE FOR BENDING GLASS SHEETS ON BENDING MOLD HAVING A COVER

[75] Inventors: Jean-Luc Lesage, Margny les Compiegne; Jean-Marc Petitcollin, Thourotte; Arnaud Borderiou; Thierry Franco, both of Compiegen, all of France

[73] Assignee: Saint-Gobain Vitrage International, Courbevoie, France

[21] Appl. No.: 935,205

[22] Filed: Aug. 26, 1992

[30] Foreign Application Priority Data

Aug. 27, 1991 [FR] France ................ 9110646

[51] Int. Cl.⁵ .............................. C03B 23/03
[52] U.S. Cl. .............................. 65/172; 65/287; 65/288
[58] Field of Search ............... 65/171, 172, 273, 287, 65/288

[56] References Cited

U.S. PATENT DOCUMENTS

| 3,574,590 | 4/1971 | Tank | 65/287 |
| 5,017,210 | 5/1991 | Petitcolling et al. | 65/287 |
| 5,125,947 | 6/1992 | Frenken et al. | 65/287 |

FOREIGN PATENT DOCUMENTS 0241355 10/1987 European Pat. Off. .
2606398 5/1988 France .

Primary Examiner—Joye L. Woodard
Attorney, Agent, or Firm—Oblon, Spivak, McClelland, Maier & Neustadt

[57] ABSTRACT

A device for bending glass sheets which includes a furnace for heating the glass, a conveyor, a bending station within which there is suspended, notably from a plate, an upper bending mold at least partly disposed inside the skirt of a peripheral suction box, and the lower face of which is covered with a covering in such a way that this covering is supported by an attachment device which can be removed and is not integral with the upper mold.

4 Claims, 2 Drawing Sheets

DEVICE FOR BENDING GLASS SHEETS ON BENDING MOLD HAVING A COVER

BACKGROUND OF THE INVENTION

1. Field of the Invention

This invention deals with techniques for bending and possibly for the thermal treatment of glass sheets, used notably for the production of automobile glazing panes. The invention concerns, more especially, those techniques that consist of heating the glass sheets up to their softening temperature, then bending them by application against an upper bending mold by pneumatic means and/or by means of a lower mold, and finally of causing them to undergo a controlled cooling after bending.

2. Description of the Related Art

According to a conventional technique the sheet passes through a horizontal heating furnace, conveyed on a bed of rollers, to be brought into a bending station where it is raised from the rollers, notably by means of a peripheral suction created by a suction box. The upward movement of the sheet terminates on its contact with the curved lower face of the upper bending mold, the curvature of which the sheet more or less follows under the effect of the suction. Shaping is then completed, either under the conjugate action of inertia and gravity by dropping the sheet onto a curved annular lower mold on which the sheet can then be removed towards the toughening station, or by a mechanical pressing operation of the sheet gripped between the upper mold and an annular lower mold. The sheet is then removed to the toughening station on this same mold or on another annular mold specifically adapted for the toughening. Reference should be made, notably, to Patents FR-B-2 085 464, EP-B-241 355, Ep-A-240 418, Ep-A-241 355 and EP-A-255 432.

This technique of taking over the sheet by peripheral suction is particularly advantageous because it makes possible the use of a large number of variants of the bending process, all starting from a first identical step of preshaping against the curved upper mold.

In this way any intervention of mechanical means for lifting is avoided, which means might result in local excess lifting, a cause of inevitable marks that would mar the optical quality of the curved sheets.

For creating a sufficient pressure difference between the two faces of the sheet, a suction chamber is thus constructed, closed at the top by the upper mold, at the bottom by the sheet, and at the sides by the walls of an open-bottomed box usually termed a "skirt", the depresurization usually being provided by air suction pumps.

Different variants relate to the dimensioning and relative positioning of the upper mold with respect to the existing skirt. Thus, from Patent FRB-2 085 464, there are known skirts profiled in such a way as to channel the lateral escapes or leakages. In this case, the upper molds are entirely housed within the skirt, for the purpose of optimizing the efficiency of the suction, notably at the critical instant at which the sheet lifts off.

It has also been proposed, in Patents EP-A-214 355 and EP-A-240 418 to operate with a "short" skirt, the curved face of the upper mold being flush with the bottom of the said skirt, which enables any harmful contact to be avoided between the walls of the skirt and the sheet in the case where the sheet might be slightly off-centered relative to the upper mold.

But whatever the profile of the skirt, the curvature of the mold and their relative positions, it has hitherto always proved essential to provide the curved face of the upper mold, which is intended to be in contact with the sheets, with an intermediate covering which, when stretched, hugs its contours. This covering, due to its flexibility and its smooth surfaces, softens the contact between glass and mold, notably by "smoothing over" the small surface imperfections of the mold which may remain even after careful machining. Furthermore, if it has a velvety nature, it is suitable for absorbing the dust which would otherwise be trapped between mold and glass, leaving its imprint on the softened glass.

Various types of covering fulfil these functions, notably those described in Patents EP-A-312 439, FR-A-2 606 398 and FR-A-2 644 156, these coverings being essentially based upon knitted or woven metal fabrics.

But even if these fabrics are satisfactory in performance, their gradual wear requires that they be periodically and fairly frequently replaced, in view of the mechanical stresses to which they are subjected, particularly where a pressing step is provided, and in view of the very high temperatures (at least 650° C.) reached by the upper mold and by the whole of the bending station, which cause accelerated oxidizing of the metal of said coverings.

These coverings are currently fixed in a detachable manner to the upper part of the upper mold, where means for attaching them under tension are uniformly distributed.

An operator can only deal with the replacement of the intermediate sheet outside the bending station, both on account of the heat and on account of the lack of access from the side to the upper part of the mold which is housed within the skirt, and this becomes all the more difficult as the mold is enclosed within the skirt. The operator must therefore stop production, disengage the assembly comprising upper mold and skirt from the bending station, both of these being attached, for example, to a removable plate, carry out the change after having allowed the mold and skirt to fall to ambient temperature, and then replace the entirety in the station and await the time necessary for these tools to reach the desired temperature. Apart from the non-negligible time during which production is interrupted by these operations, it is also necessary to allow for an adjustment time necessary following each replacement, due to the fact that it is not entirely possible to guarantee that the operator replaces the assembly comprising plate, skirt and mold exactly where they were before, to the nearest millimeter. A slightly different repositioning leads to a risk of causing slight decentering, notably of the upper mold and skirt relative to a lower annular pressing mold which, even though it may remain within the tolerance limits, would not allow the series of curved sheets to be produced in an identical manner, which is what is always desired.

SUMMARY OF THE INVENTION

It is an object of the present invention to eliminate the above disadvantages by providing a shorter and simpler process for changing the intermediate covering, which does not sacrifice the quality and reproducibility of the bending process.

The invention allows the intermediate covering to be tensioned against the upper mold independently of support from this upper mold. It therefore becomes possible to perform the changing of the covering outside the bending station, by simply removing said attachment means equipped with the covering which is to be replaced. It is thus no longer necessary to remove the upper mold from the station.

The invention therefore includes a bending station in which there is suspended from a plate an upper bending mold at least partly disposed inside the skirt of a peripheral suction box, and the lower face of which is covered with a covering sheet, this covering sheet being supported by an attachment device which can be removed by mechanical means that are not fixed to the upper mold.

This attachment device has, according to this invention, various forms of embodiment, but comprises at least one element known as a support frame, provided with fixing devices for the covering, such as simple metal pins. Said frame may be disposed either inside the volume defined by the walls of the skirt, or outside it, and preferably is connected detachably to the skirt, either directly or by means of a "lower" skirt or "deflector", detachable from the skirt and completing the profile of the skirt in its lower part.

Preferably, the support frame is disposed in such a way as to permit a free flow of air between it and the walls of the skirt.

In either case, the positioning of the assembly of the attachment devices in the bending station, notably relative to the upper mold and/or the annular lower mold, is assured by appropriate indexing systems.

The advantages of the invention are immediate: it is much less complex to remove since, during the operation of changing the intermediate sheet, only this attachment device which has a light structure, rather than the entire assembly of plate, upper mold and skirt, must be removed from this bending station. And this is all the more evident since connections between the attachment device and the upper part of the station can be released in a very easy manner by an operator.

The upper mold may thus remain permanently in the station at a homogeneous temperature, without undergoing a thermal cycle of very large amplitude at each changing operation of the intermediate covering, which assures both a saving in time and correct bending of the sheet.

Moreover, a prime advantage of this invention is that any risk of offset repositioning of the upper bending mold, notably with respect to a lower pressing or pressing/toughening annular mold, is eliminated. In this way all the relative positioning adjustments of the various bending equipment and tools are retained intact.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

It should be stated first of all that, within the framework of this invention, any type of covering commonly used for the upper bending molds, and notably one of those described in the patents mentioned above, may be used.

Figure 1:
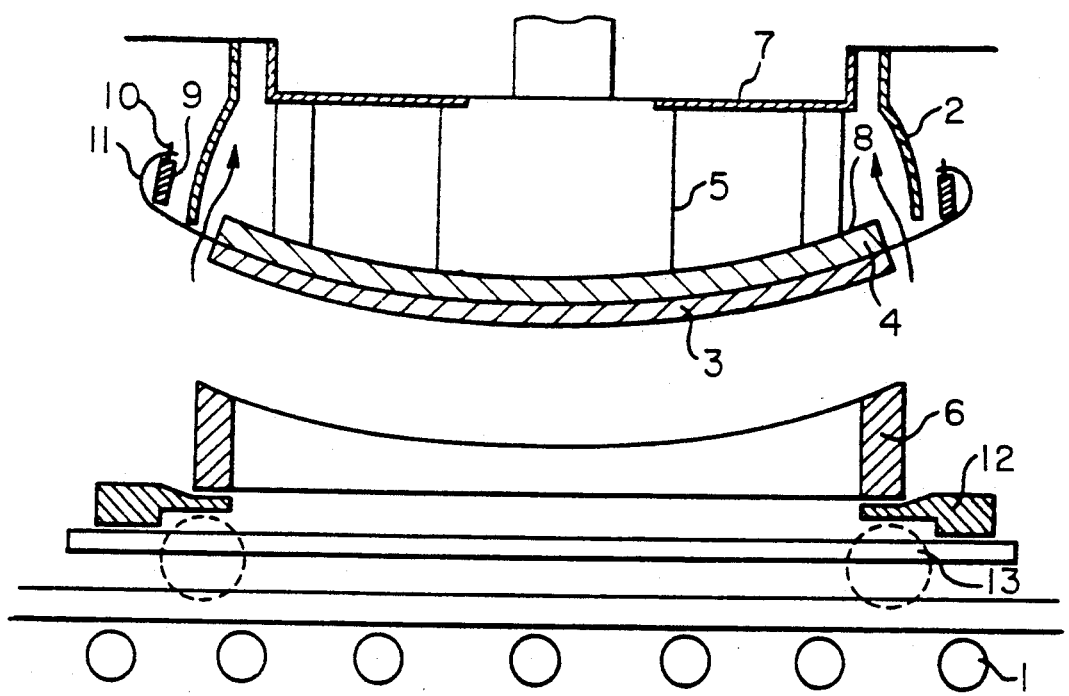
FIG. 1 is a schematic front transverse section of the upper part of a bending station according to the first embodiment of the invention.
Figure 2:
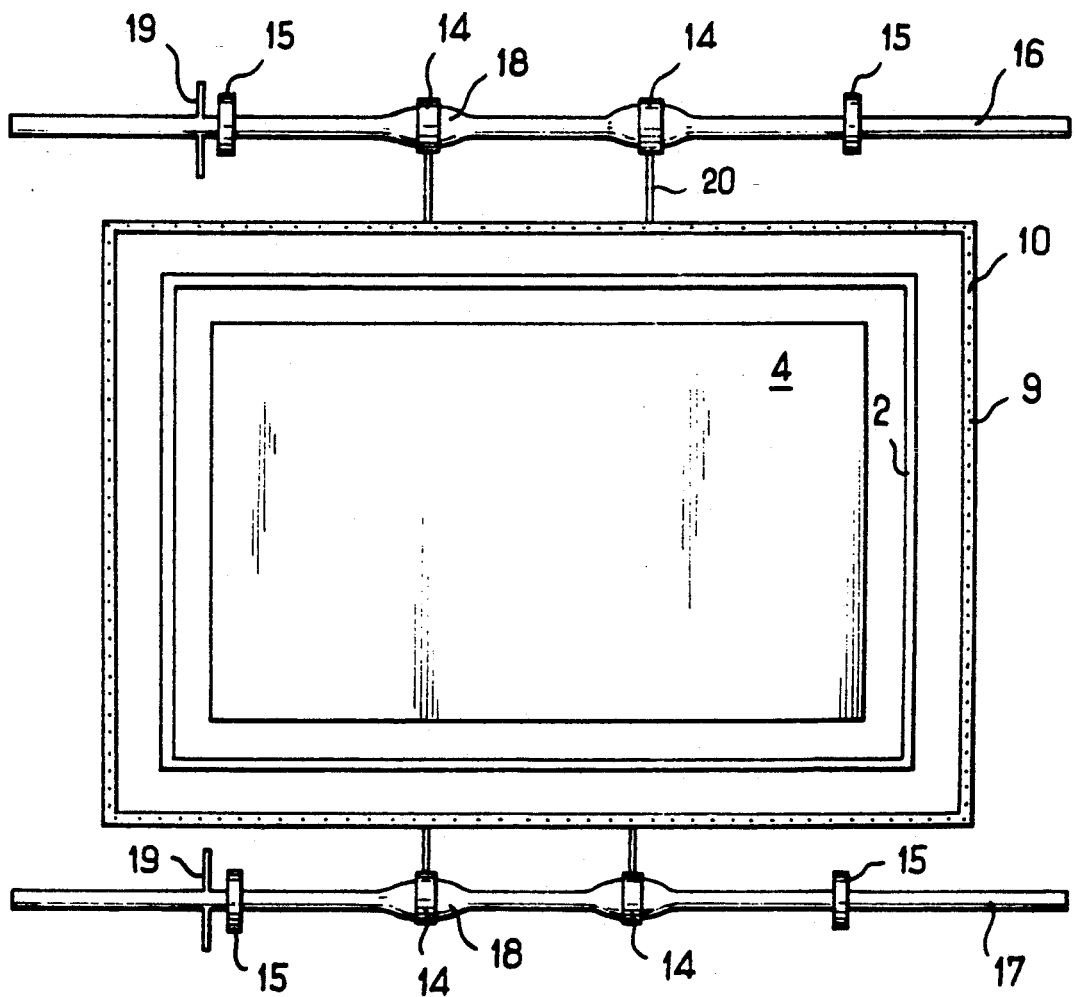
FIG. 2 is a schematic view from below of the fixing of the support frame to the skirt in accordance with FIG. 1.

The first embodiment of the invention is illustrated in FIGS. 1 and 2, and uses a skirt of the "short" type or "flush" type, known from Patent EP-A-241 355.

FIG. 1 is a very schematic cross-section through a bending station according to this invention, which is incorporated in a well-known manner into a bending installation. This bending installation (not shown) comprises successively one after another and in the order of passage of a glass sheet, a charging station for the glass sheets onto a conveyor, a horizontal straight-through furnace in which the glass sheets are heated flat, while being moved by the conveyor, and from which they emerge after having reached a temperature equal to their bending and/or toughening temperature, the bending station proper, in which the temperature of the glass sheets is at least maintained constant, and a cooling station, notably for thermal toughening, means being furthermore provided for the transfer of the glass sheets from the bending station to the cooling station.

The glass sheets enter the bending station by a conveyor, composed, for example, of a series of driven rollers 1.

The bending station comprises essentially a peripheral suction box, equipped with a skirt 2 constituting its lateral walls and connected to a suction device (not shown) in such a way as to create a depressurization or suction in the vicinity of the periphery of the sheet. FIG. 1 shows the sheet 3, already pressed against the curved surface of the upper stainless steel mold 4, itself disposed in such a way that said surface is situated outside the internal volume defined by the skirt 2. Fixing rods 5, mounted inside the skirt 2, suspend the upper mold 4 from a plate 7 to which the skirt 2 is also fixed. The plate 7 is horizontally retractable insofar as it slides in the manner of a "drawer" inside a recessed component, not shown. It is also vertically movable so that, in a raised position, a sufficient space is formed to allow a lower annular mold 6 to penetrate the bending station. The latter mold is fixed on a carrying frame 12 mounted on a movable carriage 13. It participates in the bending of the glass sheet 3 by a mechanical pressing operation against the upper mold 4, and also removes it to the toughening station once the bending has been completed. Since it participates in the pressing, this annular mold must be adjusted in level and in concentricity relative to the upper mold, so a very precise pre-adjustment must be made. It is self-evident that a separate toughening mold could instead be used for removing the sheet.

According to the present invention, the intermediate covering 11 for the upper mold 4 is not fixed to the upper peripheral zone 8 of that mold (i.e., inside the skirt 2), but to a support frame 9 suspended from the frame 7 and provided with pins 10 uniformly disposed on its upper face. This enables a covering of the woven or knitted type to be easily hooked on and unhooked from the support frame 9 situated outside the skirt 2 and suspended from the plate 7 at the vertical level of the skirt.

This fixing is explained by FIG. 2, which shows very schematically, seen from below the skirt 2, the support frame 9 and the upper mold 4, the support frame being shown, for ease of illustration, without its covering. Two types of stirrup 14, 15 can be seen here. Those of the one type 14 are connected to the support frame 9 along its opposite long sides, by means of transverse metal bars 20. The others 15 are disposed at the same height as stirrups 14 and have centers coaxial with those of stirrup 14. These stirrups 15 are fixed to the plate 7 by vertical metal bars, not shown. Two stays 16, 17, one for each of the sides, are slid through stirrups 14, 15 in such a manner as to fix the support frame 9 to the plate 7 and thus to reference it exactly around the skirt 2. The stays 16, 17 are composed of metal rods, preferably having bulging regions 18 distributed along their lengths in such a way as to provide a stable fixing after placing in position, and also a travel-limiting disc 19 at one of their ends.

Changing the intermediate covering is done in the following manner: a pressing/toughening annular lower mold 6 is brought, on its movable carriage 13, into the bending station. A pressing between the upper mold 4 and this annular lower mold 6 is simulated by lowering the plate 7 supporting the mold 4. Once the two molds are in contact, the operator withdraws the stays 16, 17 so as to allow the support frame 9 to rest entirely on studs (not shown) disposed on the carrying frame 12 of the lower annular mold 6, which studs will be described later and which make possible the keying together of the two molds.

The carriage 13 then removes the assembly outside the bending station. Replacement of the intermediate covering 11 is then carried out. The worn intermediate covering 11 is first disengaged from the pins 10 of the support frame 9. Then, in order to assure correct tension of the new covering in contact with the mold 4, a new covering is refitted by mounting the support frame to a "template" skirt and an upper mold identical in every way to those of the bending station but at ambient temperature. Once the new covering is installed on the support frame 9, the support frame 9 is exactly positioned relative to the carrying frame 12 of the annular mold 6 by means of the studs, which are adjustable in height and retractable. The studs are disposed at the periphery of the carrying frame 12 and capable of engaging into female elements disposed opposite them on the outer contour of the support frame 9.

The positioning of the lower mold 6 relative to the skirt 2 and to the upper mold 4, in both level and concentricity, has already been provided by preadjustments preceding any start-up of production, as mentioned. By thus centering the support frame 9 relative to the lower mold 6 it in therefore also exactly positioned with respect to the skirt 2 and upper mold 4.

The carrying frame 12 for the lower mold 6, on which the support frame 9 equipped with the new covering is keyed, is again mounted on the mobile carriage 13, and a pressing is again simulated so as to align the stirrups 15 around the skirt and the stirrups 14 of the support frame. The stays 16, 17 are then slid through the stirrups in order to lock the stirrups in the assembled position, and the lower mold 6 is discharged on its carriage 13. The alignment of the stirrups 14, 15 is achieved without problems since the skirt 2 and the support frame 9 have already been centered.

The advantages of such a technique are numerous. First of all, it assures better safety for the operator, since the operator only has to handle light tools which are easy to deal with such as the stays, and the cold "template" skirt and possibly also the mold, which serve for correct attachment of the new intermediate sheet. While the support frame which has been removed and the stays are still hot, they cool down very rapidly, whereas the residual heat of a solid mold or a skirt is considerably greater. On the other hand, it is no longer necessary to wait for the support frame to be completely at ambient temperature, since now there is no longer a problem of limited access during the changing of the intermediate covering because the support frame is completely released. And while the new covering is being replaced, the "template" skirt and mold are cold and therefore allow touching and handling without any disadvantage.

In addition, as a result of the indexing system using adjustable studs, the positioning adjustments between skirt, annular pressing mold and upper mold retain intact, thus saving the long and tricky adjustments which follow any change of covering.

With this first embodiment, by comparison with the technique used to date which required several hours for the complete operation, such a system allows the intermediate covering to be changed in less than 15 minutes for bending tools or molds of sufficient size for panes of the automobile wind screen type, or 5 minutes for bending molds of lesser size, in particular those adapted to the manufacture of small glazing panes of the lateral fixed window type for automobiles. This results in a gain in output which is quite noticeable with good reproducibility of bending, because all the molds or tools remain correctly positioned relative to one another.

It is also possible to fix the support frame 9 to the skirt 2 inside the skirt, the support frame 9 then having a contour of dimensions smaller than those of the skirt. Any other types of releasable mechanical fixing for the support frame may then be envisaged which allow this frame to be positioned with respect to the skirt, such as locking systems using nesting or engagement, springs etc., provided that those chosen are suitable for use at high temperature.

However, in the case where the support frame 9 is placed around the skirt 2, which corresponds to the simplest relative positioning of skirt and support frame, the peripheral suction must of necessity operate through the intermediate covering, which necessitates that a covering 11 be used which is particularly porous to air, possibly by forming small eyelets or holes in the peripheral zone.

Figure 3:
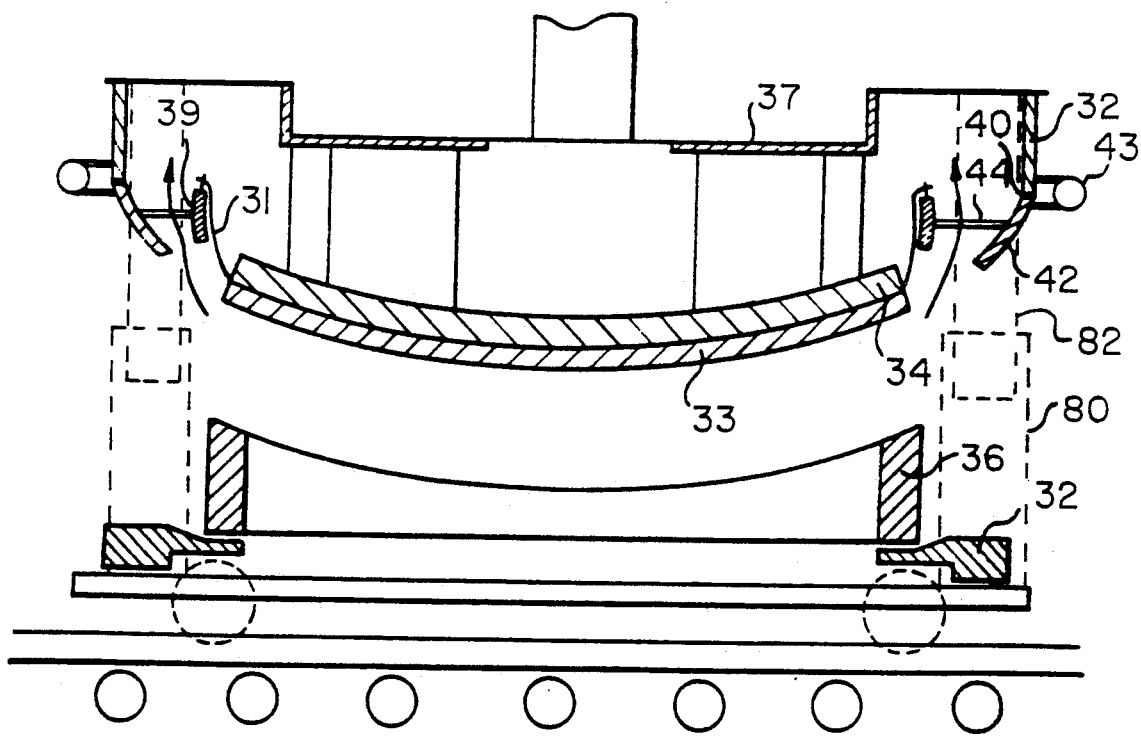
FIG. 3 is a schematic front transverse section of the upper part of a bending station according to the second embodiment of this invention.

Therefore, a second form of embodiment, illustrated in FIG. 3, is as rapid and efficient as the first, but provides a free peripheral suction space.

By maintaining a suction channel, it is possible to permit the use of dense intermediate coverings having a close texture; that is to say coverings which guarantee optimum contact with the glass and reduce any risk of its becoming marked.

FIG. 3 shows the upper part of the bending station in cross-section and highly schematically, like FIG. 1. Once again the same elements are found here, that is a plate 37, upper mold 34, skirt 32, 42, the support frame 39 over which the intermediate covering 31 is stretched in the same way. But two characteristics are different.

First of all, the support frame 39 is now systematically accommodated inside the skirt 32, 42, and has a contour substantially smaller than that of the skirt 32, 42. In this way a free lateral space is provided between the covering 31 and the walls of the skirt 32, 42, permitting a suction of the glass sheet 33 that is as effective as when the covering 31 was fixed directly to the mold 34.

But as a result of the new design of the skirt 32, 42, the fact that the support frame 39 is inside it does not pose any problem of accessibility. The skirt 32, 42 is divided into two parts: an upper skirt 32 which is fixed to the plate 37 and a removable layer skirt or deflector 42 holding the support frame 39, which is adapted to the contours of the upper skirt 32 by means of seal 40 of refractory material. Whereas the upper skirt 32 has substantially vertical walls, the lower skirt or deflector 42 has a special profile that widens out upwards, in order to leave a total internal volume of the whole skirt 32, 42 which is sufficiently large not to lead to losses of head during the suction as a result of the presence within the skirt of a supplementary tool, that is the support frame 39. Furthermore, by minimizing any risk of lateral escape by a suitable narrowing of the lower skirt 42 in its lowest part, the fluid flow around the periphery of the upper mold 34 is optimized. It will be obvious that slightly different types of profiles of the skirt 32, 42 may nevertheless be adopted.

The junction between the two skirts 32 and 42 is made by a fixing system referenced generally 43, comprising outer stirrups fixed by transverse metal bars and stays, not shown, in the same manner as the fixing between plate 7 and support frame 9 in the first embodiment illustrated in FIG. 2.

With regard to the fixing between the removable lower skirt or deflector 42 and the support frame 39, two choices can be envisaged. There may be simple small welded transverse metal bars 44 which, at uniform intervals, retain the support frame in the lower skirt, preferably substantially in the peripheral junction zone with the fixed, upper skirt. It is also possible to provide releasable fixings (not shown). In that case, transverse bars are still used, but they may wedge into U-shaped staples welded to the inner periphery of the lower skirt 42, which assure locking of the two components together as a result of the tension which the intermediate covering exerts, once the assembly of tools has been replaced in position.

The operation of changing the intermediate covering can take place slightly differently, according to two techniques.

The first technique resembles the former one, in that an annular pressing/toughening mold 36 is used to simulate a pressing action. But in this case it is no longer the support frame that is disengaged from the skirt, causing it to rest on the carrying frame of the annular mold, but the entire lower skirt or deflector 42 itself, holding the support frame 39; it is only necessary for the operator to withdraw the lateral stays 43. A system of adjustable studs (not shown) present on the carrying frame 32, and of facing female elements at the periphery of the lower skirt 42, allows this skirt to be keyed as before to the carrying frame 32. Then, outside the station, the changing of the intermediate covering 31 and the appropriate tensioning of this covering are carried out by means of a cold mold.

A variant consists of changing not only the intermediate covering 31, but simultaneously the support frame 39 and the intermediate covering 31. In this case, the releasable fixing between support frame 39 and the lower skirt 42 is used. Two support frames are now necessary, a first one used effectively inside the bending station, and a second one, provided in advance outside the station with a new intermediate covering. All that is required then is to transpose the two frames, which results in a saving of time which is quite appreciable. The replacement of the lower skirt 42 is still made onto the studs of the carrying frame 32 for the annular mold 36, which ensures perfect positioning of the lower skirt 42 and of the support frame 39 relative to the annular mold 36 and therefore relative to the upper mold 34 and the upper skirt 32, without supplementary adjustments.

The second technique enables an equivalent exactness in positioning of the various tools to be achieved, without using for this purpose the carrying frame 32 for the annular mold 36 as a transporter for the lower skirt 42. This technique consists, for the purpose of removing the lower skirt 42 and support frame 39 from the station and replacing them, of now using a specific auxiliary device. This device is translated by means of "arms" which an operator can handle in order to ensure transporting of the lower skirt 42.

In order to ensure good centering, two positioning systems are envisaged.

A first system comprises facing studs and female elements, the former on the auxiliary (device and the latter on the periphery of the lower skirt 42, the studs of the auxiliary device being mounted on springs to allow a certain latitude of relative movement, both horizontally and vertically, between the two tools.

The second positioning system consists of indexes or knives 82 fixed with respect to the upper mold 34 or, possibly, to the fixed upper skirt 32, and adapted for sliding not only at the end of travel in forks 80 fixed with respect to the lower annular mold 36, as described in U.S. Pat. No. 5,017,210 which is hereby incorporated by reference, but also in forks having recessed ends aligned along a vertical axis with the former and fitted to the external periphery of the lower skirt 42.

The "flexible" positioning of the lower skirt with respect to the auxiliary device allows slight movements, laterally and vertically, of the skirt relative to the auxiliary device, enabling any slight off-center positioning of the forks of the lower skirt relative to the corresponding knives to be taken up.

It will be self-evident that, for the first form of embodiment as for the second, any indexing system equivalent to those described here, whether studs and female elements and/or forks and knives, may advantageously be used within the scope of this invention. The same in true for the fixing systems of the stirrups and stay type.

As a result of this invention, it is thus possible to bring the total time required for changing the intermediate covering down from several hours to a few minutes which in view of the frequency of this operation, results in an important gain in terms of rate of throughput and simplicity of carrying out, while nevertheless ensuring that the precision of the bending is kept just the same.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A bending station for bending heated glass sheets, comprising:
   a vertically movable upper plate;
   an upper bending mold mounted to the plate and positioned therebelow;

a skirt forming walls of a peripheral suction box and mounted to the plate, said skirt at least partially enclosing the upper bending mold;

a covering over the bottom surface of said upper bending mold;

a support frame separate from said upper bending mold and having means for releasably supporting said covering over the bottom surface of said upper bending mold;

a deflector forming a downward skirt extension;

means for mounting said support frame to said deflector; and means for detachably mounting said deflector to said skirt.

2. The bending station of claim 1, further including:
first stirrups mounted to said deflector;
second stirrups mounted to said skirt, said first and second stirrups being coaxial; and
stirrup stays extending through the coaxial stirrups.

3. The bending station of claim 2 wherein said first and second stirrups are each positioned at two opposite sides of said support frame.

4. The bending station of claim 1 wherein said support frame is spaced from said skirt so as not to interfere with airflow into the suction box.

* * * * *